United States Patent [19]

Yankloski

[11] Patent Number: 4,488,610
[45] Date of Patent: Dec. 18, 1984

[54] SORTING APPARATUS

[75] Inventor: Richard A. Yankloski, Webster, N.Y.

[73] Assignee: Data-Pac Mailing Systems Corp., Rochester, N.Y.

[21] Appl. No.: 378,653

[22] Filed: May 17, 1982

[51] Int. Cl.³ .................... G01G 23/38; B07C 5/00
[52] U.S. Cl. ......................................... 177/4; 177/25; 177/50; 209/564; 209/698; 209/900; 101/2
[58] Field of Search ............ 209/559, 560, 563, 564, 209/592–595, 655, 698, 900, 933; 198/365, 366, 370, 704; 177/4, 25, 50; 101/2

[56] References Cited

U.S. PATENT DOCUMENTS

| | | |
|---|---|---|
| 2,669,365 | 2/1954 | Gourdon . |
| 2,677,473 | 5/1954 | Piggott et al. . |
| 2,696,919 | 12/1954 | Gourdon . |
| 2,764,275 | 9/1956 | Lens .................................. 198/704 |
| 2,912,925 | 11/1959 | Rabinow . |
| 3,137,390 | 6/1964 | Atanasoff et al. . |
| 3,246,751 | 4/1966 | Brenner et al. ................. 209/900 X |
| 3,300,026 | 1/1967 | Lens et al. ........................... 198/704 |
| 3,300,066 | 1/1967 | Henig et al. . |
| 3,368,672 | 2/1968 | Heaney et al. . |
| 3,397,392 | 8/1968 | Henig et al. . |
| 3,401,796 | 9/1968 | Hagiz .............................. 209/698 X |
| 3,573,748 | 4/1971 | Holme . |
| 3,696,946 | 10/1972 | Hunter et al. ................... 209/900 X |
| 3,837,484 | 9/1974 | Ruckebier et al. . |
| 3,901,797 | 8/1975 | Storace et al. ....................... 209/594 |
| 3,935,429 | 1/1976 | Branecky et al. . |
| 4,172,525 | 10/1979 | Hams et al. ..................... 209/900 X |
| 4,247,008 | 1/1981 | Dobbs .............................. 209/900 X |

FOREIGN PATENT DOCUMENTS

| | | | |
|---|---|---|---|
| 2303609 | 10/1976 | France .................................. 209/900 |
| 2366885 | 6/1978 | France .................................. 209/900 |
| 824414 | 12/1959 | United Kingdom ................ 209/900 |

Primary Examiner—Robert B. Reeves
Assistant Examiner—Edward M. Wacyra
Attorney, Agent, or Firm—M. LuKacher

[57] ABSTRACT

Mail sorting apparatus feeds mail items past a printing postage meter into a hopper from which the items are dropped successively into sorting bins which revolve along a circular path. Collection bins, also disposed along the circular path below the sorting bins, for different categories of mail are open at the top to receive the mail from the sorting bins. When a sorting bin carrying a mail item revolves to a position where it is in alignment with the collection bin for that item, the sorting bin is opened and the item dropped into its collection bin. The size of the item is measured at an input station. The opening of the sorting bin is carried out under computer control in response to data entered at the input station. The postage meter is movable mounted and located in response to the size of the item so that the postal indicia are printed in the proper location on the item in the course of feeding thereof into the hopper.

15 Claims, 14 Drawing Figures

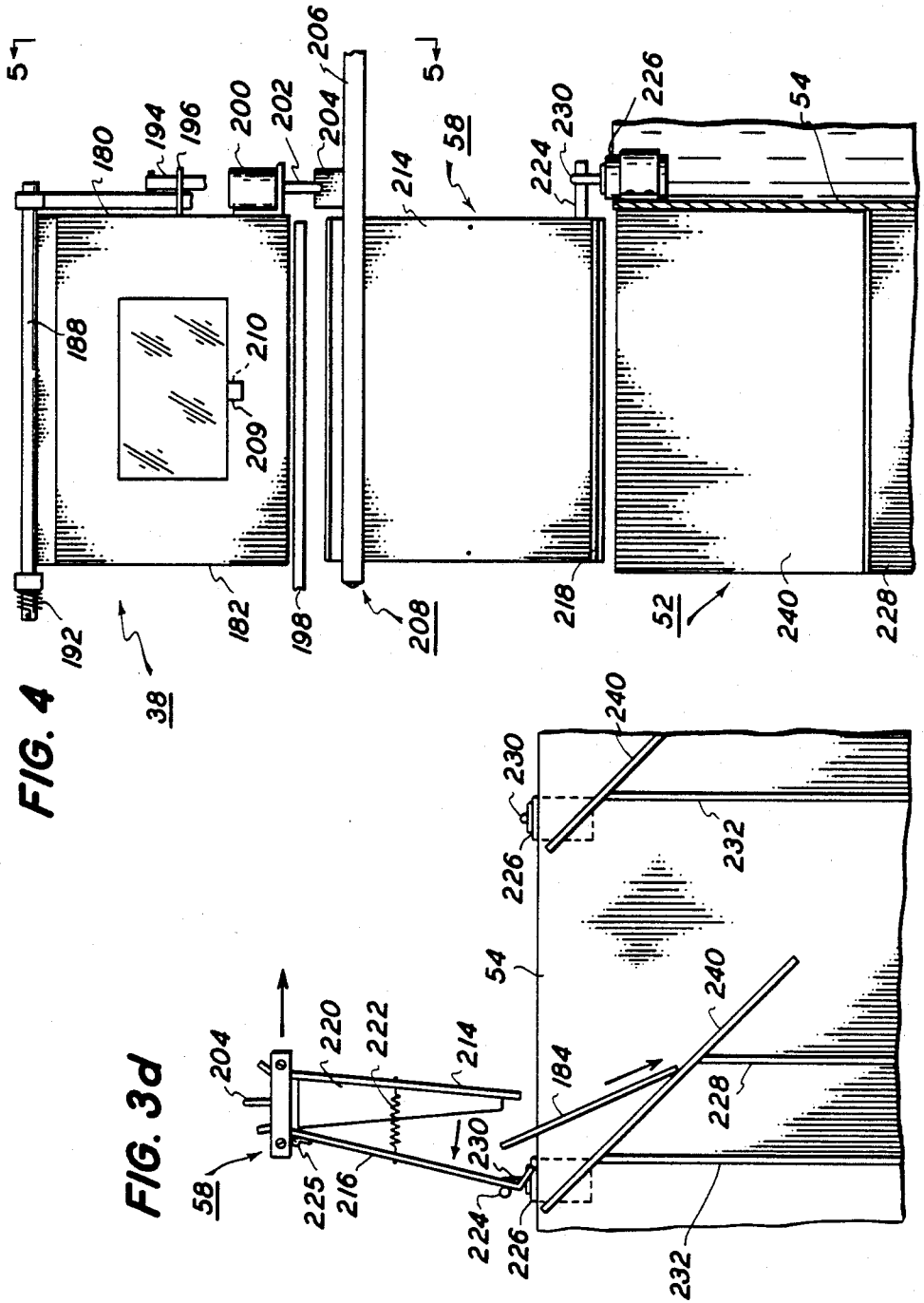

SORTING APPARATUS

The present invention relates to sorting apparatus, and particularly to apparatus for sorting mail into different categories, such as postal location zones, known in the United States as "zip codes".

The invention is especially suitable for use in pre-sorting mail in order to gain the benefit of reduced rates of postage which are applicable when mail is presorted by zipcodes. The invention may also be suitable for use in sorting incoming mail for local delivery in a plant or office. Features of the invention may be used wherever items having different categories are desired to be sorted automatically and rapidly.

Although various mail sorting systems whereby individual mail items may be sorted into different categories in accordance with their addresses have been suggested, mail sorting is still carried on manually; a human operator reading the address and placing the item in a cubbyhole for the category of mail represented by the address. The advent of the computer has facilitated the automation of the sorting process. Nevertheless, the mechanisms proposed for computer control have lacked the reliability of operation or have been too complex and expensive to be widely accepted for use in the field.

Accordingly, it is the principal object of this invention to provide improved sorting apparatus which is especially suitable for sorting mail.

It is another object of the invention to provide improved mail sorting apparatus which is capable of sorting mail automatically with reliability and at reasonable speed of operation, for example, three to four thousand pieces of mail per hour.

It is a further object of the present invention to provide mail sorting apparatus which may be used to print postage on the mail prior to sorting.

It is a still further object of the present invention to provide improved mail sorting apparatus which is adapted to handle mail of various dimensions (e.g., sizes of envelopes), print postage in the proper location on the mail and sort the mail by category, such as zip codes, all automatically.

It is a still further object of the present invention to provide improved mail sorting apparatus which operates automatically or semi-automatically under computer control and is uncomplicated in design and reliable in operation.

It is a still further object of the present invention to provide improved, automatically operative, computer controlled mail sorting apparatus which is capable of sorting mail into a large number, for example, twenty-four categories at a high rate of speed and may be manufactured at low cost.

Briefly described, mail sorting apparatus in accordance with the invention makes use of a plurality of collection bins each for a different category of mail. The bins are disposed in an array spaced from each other along a closed, preferably circular, path. A plurality of sorting bins are movable along this path. The sorting bins are preferably radially arranged along the circular path. The sorting bins are disposed vertically above the collection bins and revolve past the collection bins. Means are provided for feeding the items of mail separately into successive ones of the sorting bins, as they revolve continuously. Each sorting bin, thus, carries an individual item of mail of random category. A printing postage meter may be disposed adjacent to path along which the mail is sent into the sorting bin from an input station where the mail is read either by an operator or other reader device to provide data signals corresponding to its category to a computer. Mail items may be weighed and the size (for example, envelope width) of the mail sensed. The vertical position of the mail with respect to the postage meter is adjusted, as for example, by moving the postage meter vertically, such that the postage indicia are printed in the proper location on each mail item. Means are operative, upon movement of each of the sorting bins into vertical alignment with the one of the collection bins for the category of the mail items therein, for enabling the items to drop into the collection bin thereby to sort the mail items by category. Each collection bin will be filled with mail of the same category. Mail addressed to the same location (zip code) is thereby pre-sorted automatically and may be delivered by the postal authorities at reduced postage rates.

The foregoing and other objects, features, and advantages of the present invention, as well as a presently preferred embodiment thereof, will become more apparent from a reading of the following description in connection with the accompanying drawings in which:

FIGS. 3a through 3d are end views diagramatically showing the hopper and a sorting bin in cooperative relationship with each other and the sorting bin in cooperative relationship with a collection bin so as to illustrate the operation of the apparatus shown in FIGS. 1 and 2;

FIG. 4 is a fragmentary front view illustrating the hopper, a sorting bin and a collection bin at the station where the hopper is located;

Figure 1:
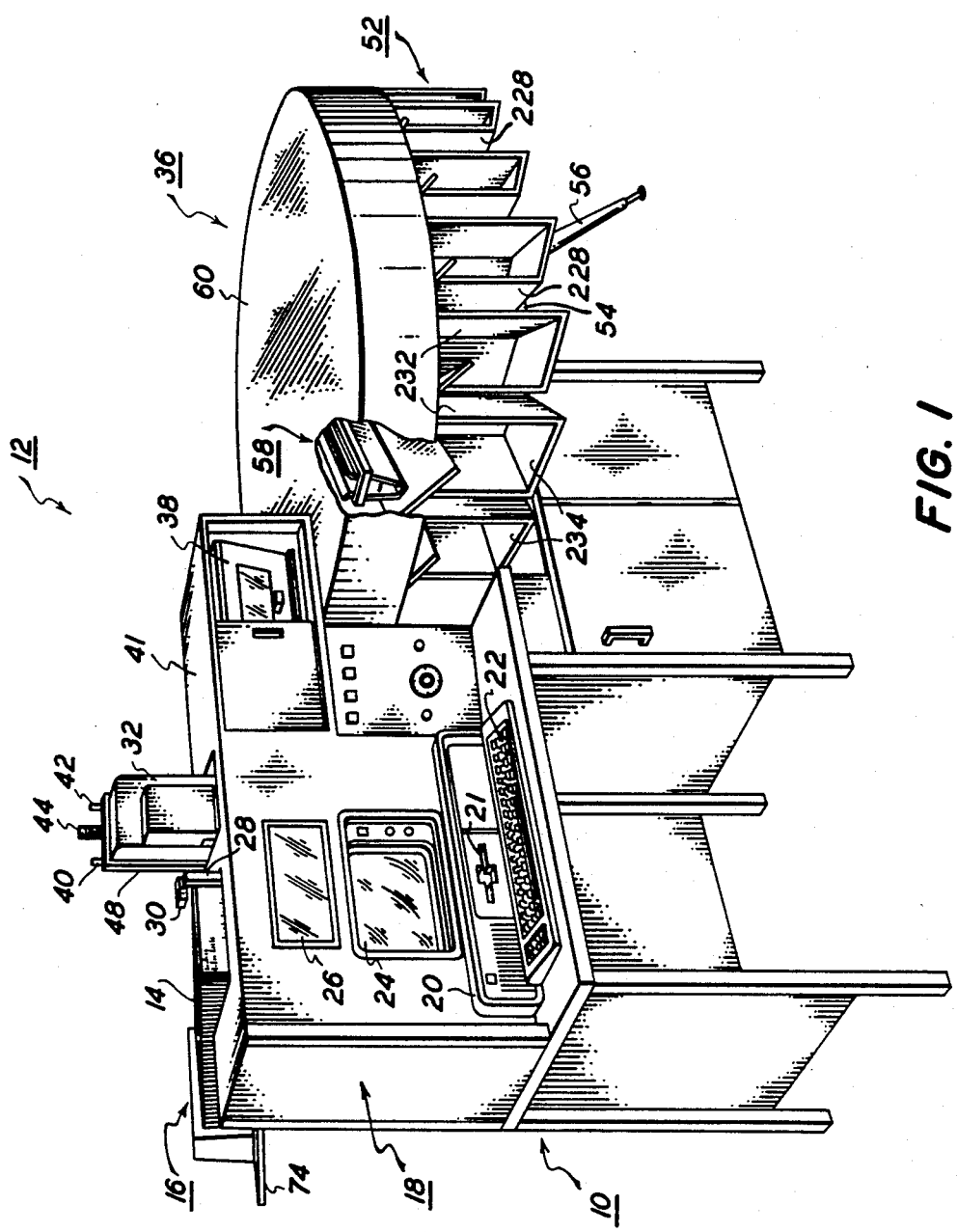
FIG. 1 is a perspective view of mail sorting apparatus in accordance with a presently preferred embodiment of the invention.

Referring to FIG. 1, there is shown a table 10 on which mail sorting apparatus 12, in accordance with a presently preferred embodiment of the invention, is disposed. The mail handled by the apparatus 12 is contained in envelopes addressed to different homes or places of business in a locality, such as a city, having different post offices or distribution centers, each assigned a different code, such as a zip code. The zip codes appear on the envelopes. It is desirable to sort the envelopes in accordance with their zip codes, since the postal authorities offer a lower postage rate for pre-sorted mail. A stack 14 of such envelopes, randomly arranged so far as their zip codes are concerned, is placed in a feeder 16 mounted at the top of an input station 18 of the apparatus 12. Also located at the input station 18 is a micro-computer 20 having a disk drive 21, a keyboard 22 and a CRT (cathode ray tube) display 24. The micro-computer is preferably a commercially available model. The keyboard, display and disk drive are accessible to the operator of the apparatus 12 who may be standing or seated at the front of the table 10.

The envelopes are removed, one at a time, from the stack 14 and allowed to drop into a receptacle behind a viewing port 26 of the input station 18. Prior to dropping into the viewing port, the width of each envelope is measured by a photoelectric sensor 28 illuminated by a lamp 30. The vertical height of the envelope above a reference plane, which corresponds to the width of the envelope, is measured and a signal corresponding to the width of the envelope is presented to the computer 20. The width of the envelope is used to determine the proper location for the postage indicia (a postage meter stamp) which is to be printed on the envelope by a postage meter 32.

In addition to the input station, the other major components of the apparatus 12 are feeding means by which each envelope is moved or transported, first to the postage meter 32 and then to the sorter 36. The sorter includes a hopper 38 which is disposed in a cabinet 42. The feeding means is located in the cabinet between the receptacle 72 (FIG. 2) behind the viewing port 26 and the hopper 38. Each envelope has a code representing its zip code entered by the operator on the keyboard. It will be appreciated that zip codes may be entered automatically by a code reader which may be located in the receptacle 72 behind the viewing port 26. Optical character readers may be used for automatically reading the zip codes. It is presently preferred, that for automatic reading, the zip codes be printed as a bar code which is more readily translated into a digital signal for input to the computer 20.

Figure 6:
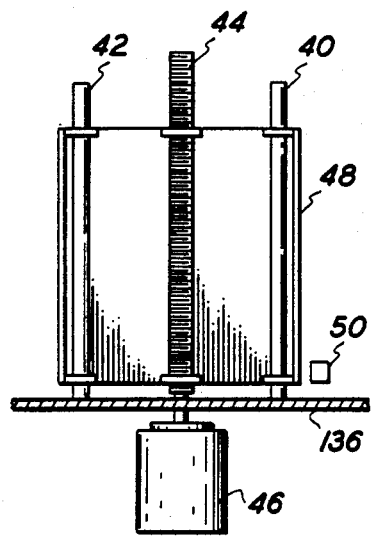
FIG. 6 is a fragmentary view from the rear of the apparatus, taken along the line 6—6 in FIG. 2.
Figure 7:
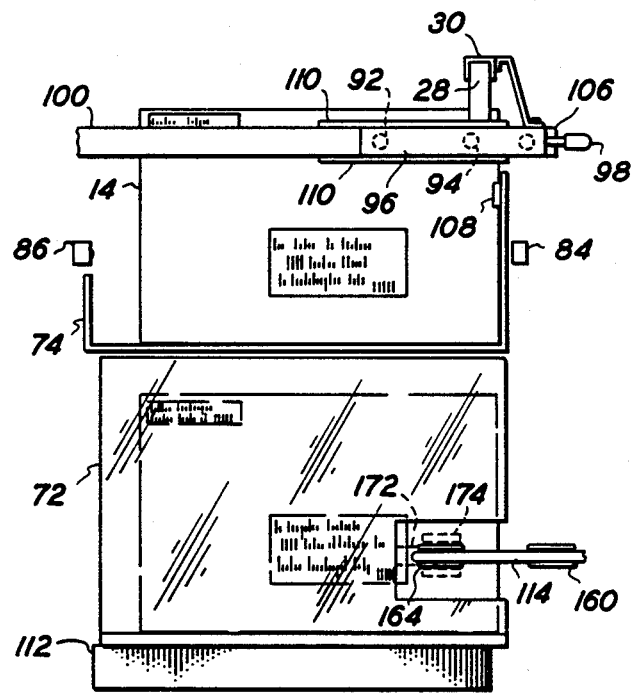
FIG. 7 is a fragmentary view from the front of the apparatus, taken along the line 7—7 in FIG. 2.

The receptacle 72 is preferably provided with automatic weighing means, such as a load cell 112 (see FIG. 7). The computer senses a signal presented by the load cell. The weight signal from the load cell and the width signal from the photoelectric array 28 is presented to the postage meter. The postage meter is mounted for vertical reciprocation on slides 40 and 42 by a lead screw 44 (see also FIG. 6). The postage meter is set to the vertical position and for printing the correct amount of postage in accordance with the weight of the envelope under control of the computer 20. A stepping motor 46 turns the lead screw 44 which is threaded into a frame 48 on which the postage meter 32 is mounted (see FIG. 6).

Figure 2:
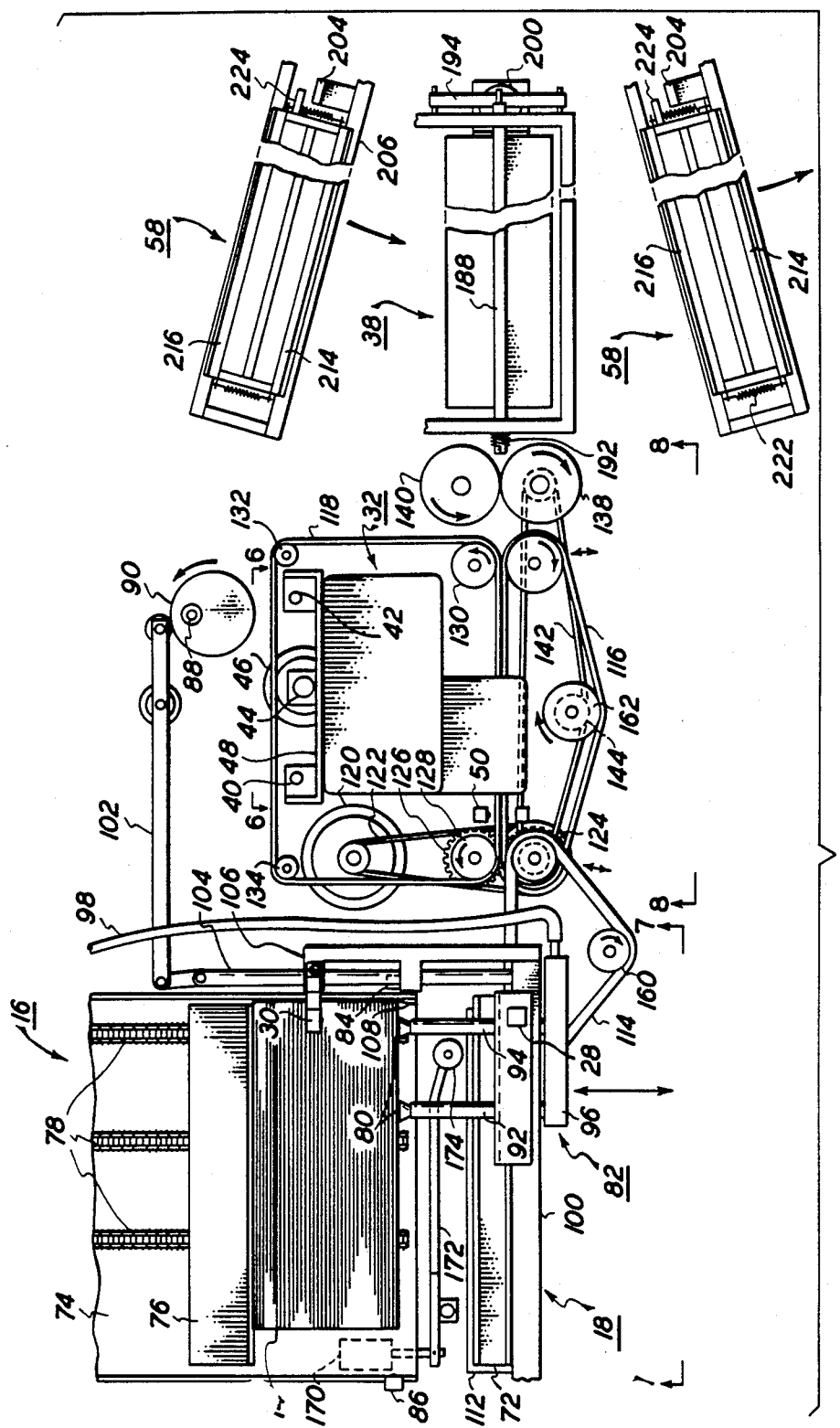
FIG. 2 is a plan view of the apparatus shown in FIG. 1 with the covers removed and fragmentary in part.

The location of the envelope into printing position is detected by a photoelectric sensor 50 (see FIGS. 2 and 6). Similar photoelectric sensors are used to determine the location of the envelope at various positions in the apparatus 12. Inasmuch as the speed of the feeding mechanism, sorter and other moving parts of the apparatus are generally constant, the computer responds to the sensor signals and generates command signals for controlling the operation of the apparatus.

The sorter 36 has an array 52 of collection bins. The bins are radially arranged around a circular path. Each bin is assigned to a different category, which, when the apparatus 12 is used for pre-sorting mail, is a different zip code. When the apparatus is used for other purposes, the collection bins may be assigned to different categories. For example, if the apparatus 12 is used to sort incoming mail for an office or plant, the categories may be different mail stops for the delivery person. After the incoming mail is sorted by the apparatus 12, the delivery person merely removes the mail sorted by the apparatus 12 from the open end of the collection bin and makes the rounds to the mail stops. The collection bins may be mounted on a cylinder 54, supported on the table 10 and also by an additional leg or legs 56 (see also FIGS. 9 and 10).

A radial array of sorting bins 58, one of which is shown in FIG. 1 by breaking a cover 60 away to illustrate the bin, revolves around a circular path (also the path along which the collection bins 52 are arrayed) vertically spaced above the collection bins 52. The sorting bins are mounted to a shaft 62 (see FIG. 9) which is rotated continuously during sorting operation of the apparatus 12. Each envelope moves successively along the feeding means, into the hopper 38 and from the hopper into a sorting bin. The letters drop from the hopper into successive sorting bins as they revolve past a load station at which the hopper is located. This sequence of operation will be more apparent from FIGS. 3a through 3d. Since the envelopes were randomly arranged so far as their zip codes are concerned in the stack 14 at the input station 18, the envelopes are fed and located in random order in the sorting bins 58. The location of each sorting bin is sent by a shaft encoder 64, coupled by a belt and pulley arrangement 66 to the shaft 62 which drives the sorting bins 58. The encoder thus provides a digital signal representing the vertical alignment of the sorting bins 58 with the collection bins 52. The zip codes for category of item in each sorting bin is also provided, since the location of the sorting bin at the loading station under the hopper 58 is also provided by the encoder 64 (FIG. 9) and the zip code of the envelopes in the hopper is obtained from the keyboard 22 or automatically as described above. Accordingly, upon movement of each of the sorting bins into vertical alignment with a collection bin for the category (zip code) of the item (the envelope) carried in the sorting bin, the sorting bins are selectively opened, enabling the item to drop into the collection bin for the category corresponding thereto.

Figure 8:
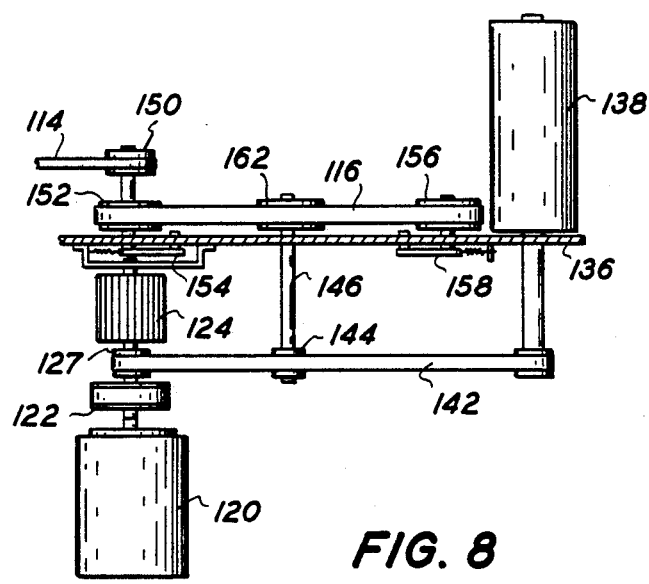
FIG. 8 is a fragmentary view again from the front of the apparatus, taken along the line 8—8 in FIG. 2.

Referring next to FIGS. 2, 7 and 8, the operation of the input station 18 and the feeding means of the apparatus 12 will be observed in greater detail. The purpose of the feeding means is to transport an envelope from the receptacle 72 to the hopper 38.

Consider first the operation of the feeder 16 of the apparatus 12 at the input station 18 to feed envelopes one at a time into the receptacle 72. The stack of envelopes 14 is placed on a tray 74. A backing and pusher bar 76 is driven by drive belts 78 and pushes the envelopes against suction pads 80 of a suction pick-up mechanism 82. The belts 78 are driven by a motor in response to signals from a photosensor 84 which is illuminated by a lamp or other photoemitter 86. When the light beam from the lamp 86 to the photosensor 84 is not broken, the motor is actuated to move the pusher bar 76 forwardly so as to advance the stack 14. The first envelope in the stack then cuts the beams from the lamp 86 and the pusher bar 76 stops.

The first envelope in the stack 14 is selected upon operator demand; the operator actuating a selection key on the keyboard 22 (FIG. 1) or automatically at a regular rate. The advance envelope selection is operated by another motor through an electromagnetic springwrap clutch (not shown) which turns a shaft 88. The shaft 88 drives a cam 90 through a single revolution. The cam drives the suction pick-up mechanism 82. This mechanism 82 has hollow rods 92 and 94 which terminate in a bar 96, which is also hollow and connected via a hose 98 to the vacuum pump. Suction is then applied continuously through the bar 96 and the rods 92 and 94 to the cups 80. The rods are reciprocally moveable in holes in a support member 100. The support member 100 is connected to another support member 106 having appertured fingers for guiding a link 104 of the pick-up mechanism 102. The link 104 is connected in a linkage with a cam follower link 102; the end of which follows the cam 90 as it rotates. Accordingly, the suction pick-up mechanism 82 will move back and forth selecting the first envelope in the stack.

In order to insure that the first envelope separates from the envelope in back of it, the envelopes are deflected by a separator stone 108 on the forward edge of the right side of the tray 74. An individual envelope, first in the stack 14, is then pulled forward against bars 110 (see FIG. 7) which project inwardly of the support member 100. These bars strip the envelope from the suction cups 80 as they move outwardly toward the front of the apparatus. The envelopes then drop into the receptacle 72.

The load cell 112, which forms a base for the receptacle 72, then provides signals to the computer where they are converted into a digital signal representing the amount of postage required for the postal service to deliver the envelope. This postage amount signal is generated by weight to postage conversion logic, preferably in the computer 22 and then applied to the postage meter 32.

It will be observed that the envelope width measuring photosensor array 28 is also mounted on the support member 100. The lamp 30 is mounted on a bracket connected to the guide bar 106. The tray 74 slopes downwardly as shown in FIG. 1. Accordingly, the first envelope in the stack 14 will intercept the beam from the lamp 30 so that the signal from the array 28 indicates the width of the first envelope in the stack 14. Instead of lamps, the photosensors may be illuminated by photoemitters of visible or invisible light, which may be semiconductor devices such as light emitting diodes.

The feeding means makes use of three belts 114, 116 and 118. These belts are continuously driven by a motor 120 which is mounted on a support (not shown). The motor 120 drives a belt 122. A gear 124 and another pulley 126 are connected on a common shaft with a pulley 127. The gear 124 meshes with another gear 126 having a pulley 128. The belt 118 is entrained around the pulley 128 and three idler pulleys 130, 132 and 134. The belt 118 is disposed above a deck 136. Journaled in this deck are a pair of rollers 138 and 140. The rollers are made of compliant material such as rubber. The nip between the rollers 138 and 140 is in alignment with the nip or contacting region of the belts 116 and 118. The roller 138 is driven by a belt 142 from the pulley 127. The belt 142 may be a "V" belt (V-shaped in cross section). A pulley 144 inside of the belt 142 is driven by the belt 142. This pulley 144 is keyed to a shaft 146. The shaft 146 is journaled in the deck 136 and is keyed to another pulley 162 which drives the belt 116. The belt 114 and the belt 116 are entrained around pulleys 150 and 152 (see FIG. 8). These pulleys are mounted on a common shaft which is journaled on a spring biased, pivotally mounted arm 154. The arm 154 is biased towards the rear of the apparatus so as to bring the belt 116 into intimate contact with the belt 118 in the nip region thereof. In the event that a thick item enters between the belts 116 and 118, the pulleys 152 and 150 may move outwardly to accept the thick envelopes. Similarly, another pulley 156 around which the belt 116 is entrained is mounted on a spring biased pivotal arm 158, again for facilitating the feeding of thick envelopes. The other pulleys 160 and 162, around which the belts 114 and 116 are entrained, take up the slack in these belts.

As shown in FIG. 7, the belt 114 is also entrained around a pulley 164 and extends into the receptacle 72. After the zip code of the envelope in the receptacle is entered, a solenoid 170 is energized and pivots an arm 172 having a idler roller 174 of resilient material on the end thereof. This idler roller 174 forces the envelope against the belt 114 and holds the envelope until the leading edge thereof enters the nip region between the belts 116 and 118. The envelope enters the nip between the rollers 138 and 140 upon leaving the belts 116 and 118, and the rollers 138 and 40 feed the envelope into the hopper 38. The hopper 38 is part of the sorter 36. The location of the hopper 38 defines the loading station for the sorter 36. The design of the hopper will be more apparent from FIGS. 2, 4 and 5.

The postage meter 32 is disposed along the feed path. It is located vertically by the motor 46 and the feed screw 44, as explained above in connection with FIGS. 1, 2 and 6, so as to locate the postage indicia in the proper position (the upper right hand corner) of the envelope. The printing mechanism of the meter 32 may be of the design which prints while the envelope is moving through and past the print head of the meter. A suitable postage meter may be of the type commercially available from Pitney-Bowes.

Figure 5:
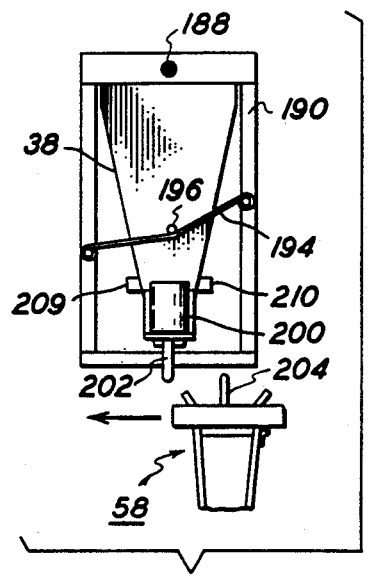
FIG. 5 is a fragmentary end view taken along the line 5—5 in the direction of the arrows in FIG. 4.

Consider first the construction of the hopper 38. It is a generally triangular cell (see FIG. 3a) which is closed on the top 176, front and rear sides 178 and 179 and at one end 180 (FIG. 4). The opposite end 182, which faces the nip rollers 138 and 140 is open to receive an envelope 184. The bottom 186 of the hopper 38 is open. The hopper is pendulously mounted on a rod 188. A frame 190 (FIG. 5) pivotally mounts the rod 188. A return spring 192 (FIG. 2) on the rod 188 biases the hopper to swing in a counterclockwise direction as viewed in FIGS. 3a through 3c. This is the clockwise direction as viewed in FIG. 5. A belt 194 of resilient material such as rubber or leather disposed between the vertical posts at the rear of the frame 190, as shown in FIGS. 4 and 5, engages a rod 196 on the outer end 180 of the hopper and acts as a snubber to damp the swing of the hopper and locate it vertically. When so located, the open bottom 186 is blocked by a bar 198.

Figure 3C:
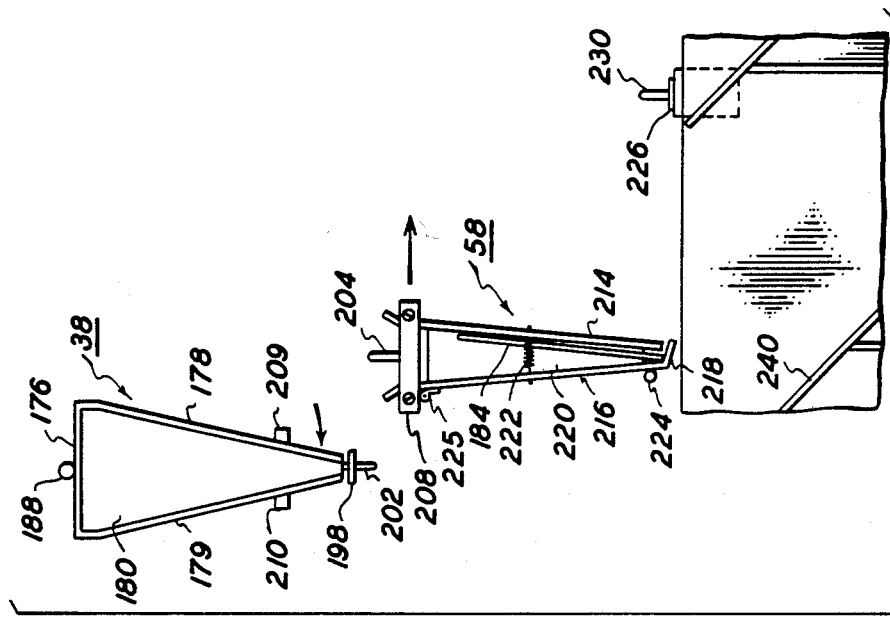
Figure 3B:
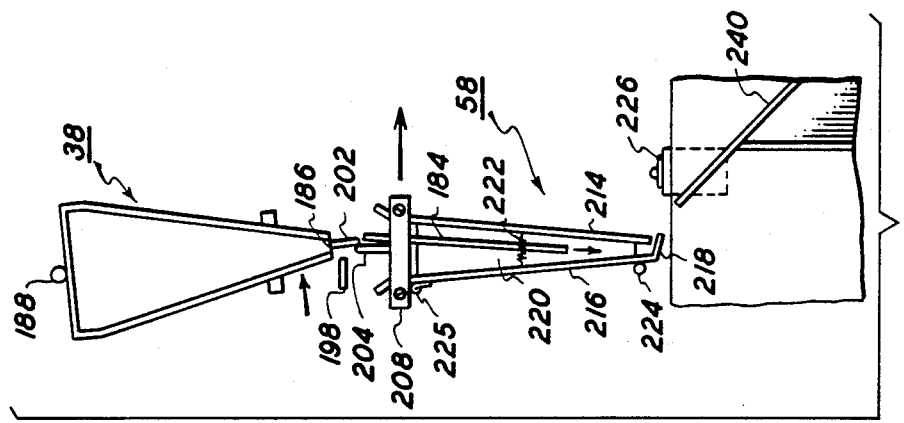
Figure 3A:
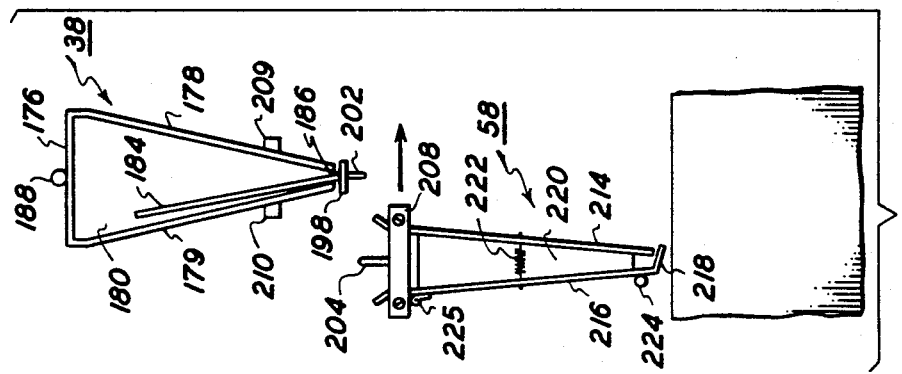

A solenoid 200 with a downwardly projecting plunger 202 is mounted near the bottom of the outer end wall 180 of the hopper 38. When the solenoid 200 is in an actuated state, and it is not normally actuated, the plunger 202 is extended for engagement with upwardly extending tabs 204 on leading legs of frame 208 (see also FIG. 9) which supports the revolving sorting bins 58. The plungers 202 of the solenoid 200 cause the hopper to swing in a counterclockwise direction as viewed in FIGS. 3a through 3c. The open bottom end then swings clear of the bar 198 and the envelope is allowed to drop into one of the sorting bins 58 which then is disposed in vertical alignment with the hopper. The dropping of the envelopes is best seen in FIG. 3b.

After the envelope drops and the sorting bin passes the loading station where the hopper 38 is disposed, the hopper swings back to vertical position where its open bottom end 186 is blocked by the bar 198. This is the position shown in FIG. 3c. In order to prevent an improper indication or tagging of a sorting bin 58 as containing an item when the sorting bin is empty because the hopper was not full at the time the sorting bin came into vertical alignment therewith, or if the item was cocked in a position in the hopper where it might not drop when the hopper was pivoted clear of the blocking bar 198, two sets of photoemitters (such as lamps) 209 and photodetectors 210 are mounted spaced from each other on the side walls 178 and 179 of the hopper 38. In the case where the envelope 184 blocks the beam to the photodetectors of these sets 209 and 210, the solenoid 200 remains unactuated. It will be appreciated that, alternatively, the solenoid 200 may be spring actuated with the plunger extended and energized to retract the plunger. The solenoid 200 may be spring biased in the opposite direction to be normally retracted and extended only when the solenoid 200 is energized. Accordingly, only when the hopper is full with an envelope that is in position to drop into the next sorting bin which comes along into vertical alignment with the hopper, is a signal from the encoder 64 (FIG. 9) used to indicate or tag a sorting bin as having an item of the zip code category which was inputted at the input station. The next sorting bin to arrive at the loading station will then normally be tagged as having that item. However, if a hopper full indication is not received within a predetermined time, an alarm indication is provided and the sorting is stopped either manually or automatically. Corrective action, such as the clearing of possible jams, is then taken.

Figure 9:
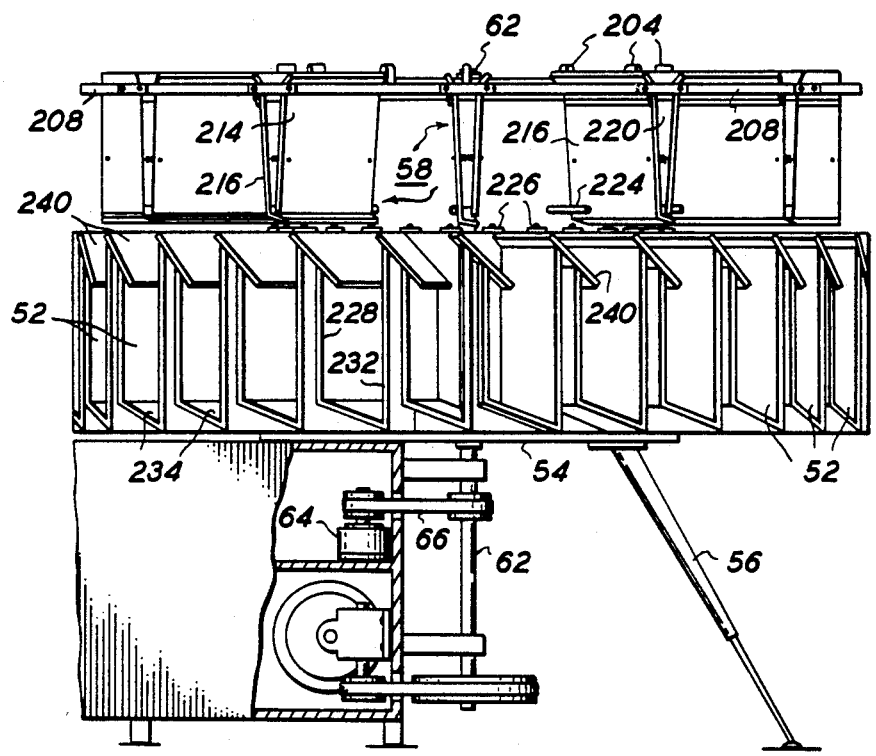
FIG. 9 is a fragmentary sectional front view showing the sorting and collection bins and the drive mechanism for the sorting bins.
Figure 10:
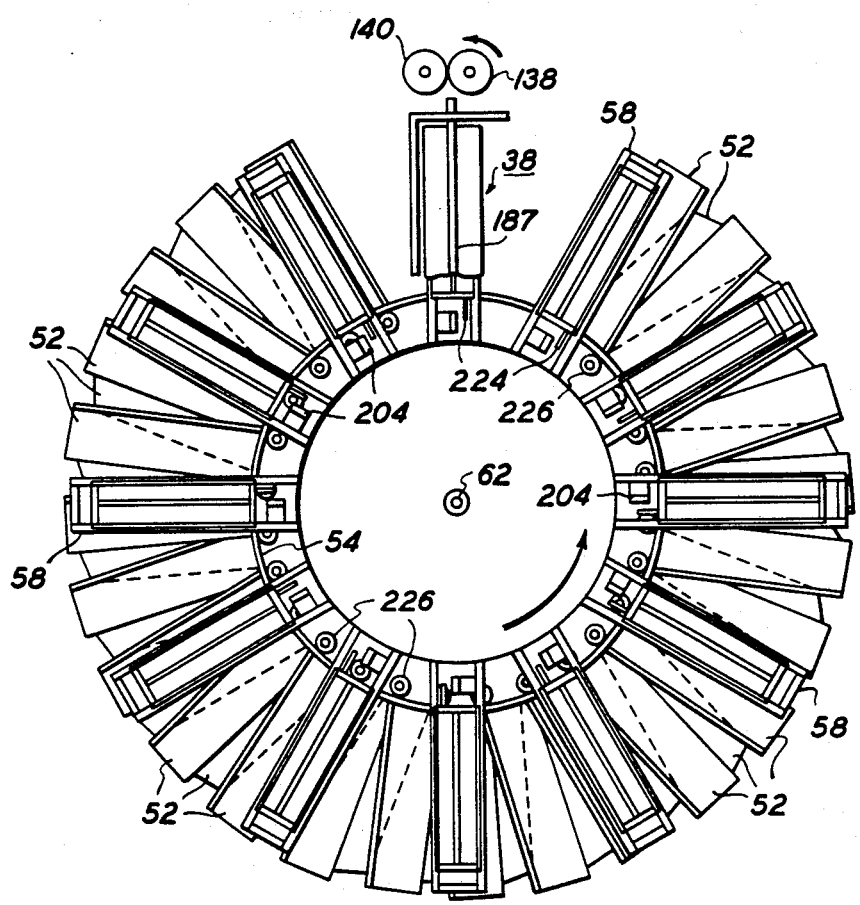
FIG. 10 is a top view of the array of sorting bins and collection bins of the sorting apparatus illustrating in FIGS. 1 through 9.

The construction and operation of the sorting bins 58 will best be apparent from FIGS. 2, 3a through 3d, 4, 9 and 10. Each bin is identical. It has a fixed side plate 214 and a pivotal side plate 216. The pivotal side plate has a lip 218 bent inwardly toward the fixed side plate. Trapezoidal end members 220 of resilient material are attached along one edge to the fixed side plate 214. Springs 222 yieldably bias the plates toward each other and bring the pivotal side plates 216 into contact with the free edge of the end members 220 to form cells of generally trapezoidal cross section open at the top and closed by the lip 218 at the bottom. The sorting bins 58 are disposed around a circular path in a radial array by the radially arranged support frames 208. The fixed side plate is attached to the leading side in the direction of revolution of each frame 208. The pivotal side plate 216 is connected by a hinge 225 to the trailing side arm of each frame 208. The frames are connected to the shaft 62 as shown in FIGS. 9 and 10. In other words, there is a "merry-go-round" of sorting bins. In the illustrated embodiment there are 12 such sorting bins equally spaced along the circular path around which they revolve. The collection bins 52 are, in this illustrated embodiment 24 in number. Also spaced around the circular path, the sorting bins are vertically spaced above the collection bins. Accordingly, when a sorting bin moves into vertical alignment with a collection bin and the sorting bin carries mail of the category destined for the collection bin, the pivotally mounted side 216 is opened and the item drops into the collection bin for which it is destined (see FIG. 3d). The lip 218 enables an item such an envelope 184 to be held in the sorting bin 58 with springs 222 of reasonable size without the weight of the envelope causing the bin 58 to open (see FIG. 3c). The use of such relatively weak springs has another advantage in not requiring large amounts of force to swing the side 216 open.

In order to open the swinging side 216, rods 224 are connected thereto. Solenoids 226 are disposed adjacent the leading side 228 of each collection bin. These solenoids are selectively energized, depending upon whether the sorting bin carries an envelope 184 destined for the sorting bin adjacent which the solenoid 226 is disposed. Then, the plunger 230 on the solenoid adjacent to the bin for which the envelope is destined is extended upwardly and engages the rod 224 on the pivotally mounted side 216 of the sorting bin passing over the solenoid. The side 216 then pivots outwardly and opens the bin allowing the envelope 184 to drop as shown in FIG. 3d. As the sorting bin continues to revolve, the rod 224 moves up and over the top of the plunger 230 and the arm 216 swings backward toward the end members 220. Since these members 220 are of resilient material they stop and damp the pivotal side 216 with a minimum of noise and vibration.

The collection bins 52 each have two plates; the plates 228 and another plate 232 which is parallel thereto. These plates are attached at their inside end to the cylinder 54. The floor 234 of each collection bin 52 is inclined downwardly from the leading side 228 to the trailing side 232 thereof. This inclination allows the envelopes sorted into the bin to form a stack against the trailing side wall 232. Also, in order to facilitate the dropping of the envelopes 184, the leading side wall 228 has an inclined portion with a flange 240 thereon. The envelopes 184 strike this flange 240 and are guided along the flange to the sloping floor 234 where they stack against the trailing side wall 232. It will be seen therefore that each collection bin 52 is a U-shaped cell. The side walls 228 and 232 and the floor 234 may be bent from a single piece of sheet metal.

Figure 11:
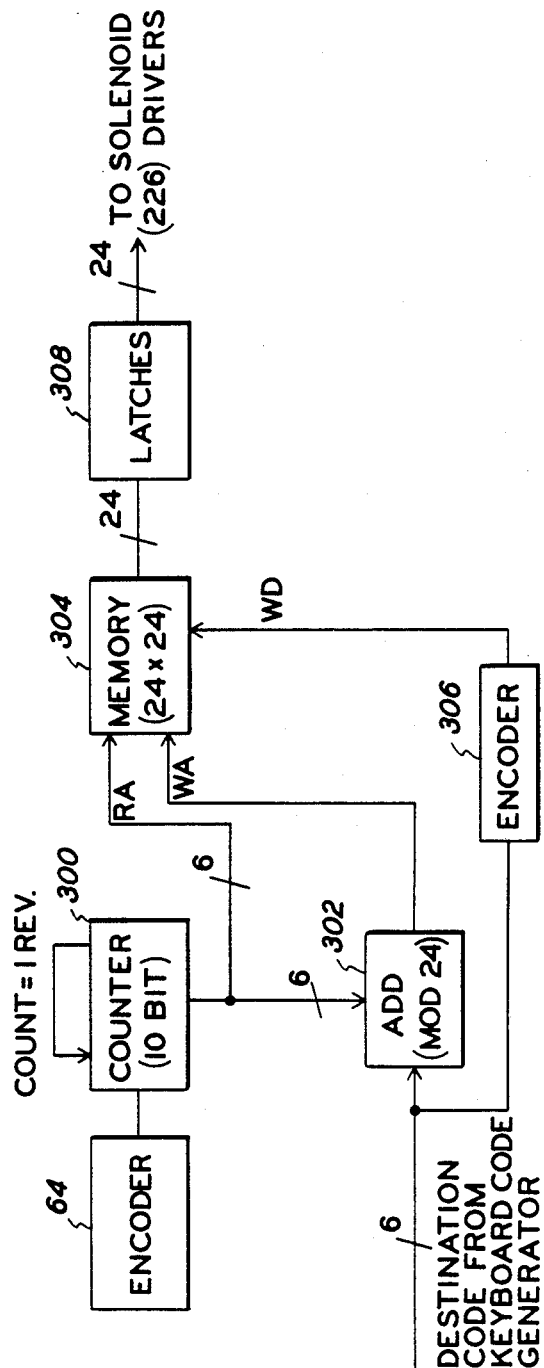
FIG. 11 is a block diagram schematically illustrating the operation of the computer and related electronic componentry of the sorting apparatus.

The operation of the computer 20 in controlling the solenoid 226 in order to allow the envelopes 184 to drop into the bins for their respective categories (zip codes) will be more apparent from the functional block diagram of FIG. 11. The encoder 64 provides a sequence of bits, for example, 600 bits each every 360/600th of a revolution of the shaft 62. Since the collection bins 52 and the sorting bins 58 are equally spaced around the circular path and there are 24 collection bins, every 25 pulses from the encoder 64 indicates that the sorting bins will revolve into alignment with a different group of the collection bins. The pulses from the encoder are counted in a 10-bit counter 300. This counter is reset at a count of 600; the shaft 62 and the sorting bins 58 making one complete revolution each time the counter 300 is reset. When reset occurs, one of the sorting bins will be located at the loading station in vertical alignment with the hopper. This sorting bin is considered to be bin number 1. The collection bin which is then in vertical alignment with the sorting bin number 1 is considered to be collection bin number 1.

A 6-bit digital signal from the counter 300 indicates the position of the sorting bin arrays with respect to the loading station. Although there are only 12 sorting bins in this example, each may revolve to 24 different positions in vertical alignment with different ones of the collection bins. The 6-bit digital signal from the counter represents the 1 of the 24 different positions relative to the collection bins of the sorting bin at the loading station. The destination code for the envelope which is dropped from the hopper into the sorting bin at the loading station is presented by the keyboard code generator in the computer and adds in a modulo twenty-four adder 302 with the position code from the counter. The modulo twenty-four addition provides a write address (WA) to a memory 304 which presents a 24×24 bit matrix. The destination code is encoded into a 1 out of twenty-four bit signal by an encoder 306 and presented as data to the memory. The destination code also goes to a read address input (RA) of the memory 304 which translates the output of one row of the memory to twenty-four latches 308 which enable solenoid drivers to energize selected ones of the solenoids 226.

Consider for example, that a sorting bin in position 10 of the 24 positions is at the loading station and the destination code indicates that the letter which is dropped into that bin has a destination of collection bin number 7. The adder then sets the matrix for row 17 to "1". Now when the sorting bin moves to position 17 as indicated by the RA input from the counter 300, row 17 in the matrix in memory 304 is read out into the latches 308. Since the latch corresponding to bin 7 is set to "1", this causes the solenoid driver to transmit current to the solenoid adjacent to bin 7 as the bin which was loaded in position 10 approached collection bin 7. The sorting bin with the envelope destined for bin 7 will then open when it comes into vertical alignment with bin 7 and the envelope will drop into bin 7.

Consider another example where the sorting bin is loaded with an envelope destined for the collection bin at position 20 when that sorting bin is in position 22. The adder 302 performs a modulo twenty-four addition the desired plus current position (42−24=18). Accordingly, the sorting bin loaded at position 22 will reach the collection bin at position 20 when it moves 18 positions. We then set bit 20 in row 18 of the matrix in memory 304 to a "1". When the sorting bin moves to position 18 as indicated by the read address (RA), the binary "1" data at position 20 will be transferred to the latches 308 and the solenoid 226 adjacent to the collection bin at position 20 will be energized. The envelope destined for collection bin 20 will then drop from the sorting bin in which it is carried into the collection bin at position 20. It will be seen that different bits in different ones of the 24 columns will be set in different rows depending upon the destination and the location of the sorting bit at the loading station. Each time the sorting bins revolve to position, a different group of sorting bins will open to facilitate rapid sorting of the envelopes into the collection bins. The above operations and componentry is realized by software or firmware in the computer.

In order to inform the operator that a collection bin is full, additional photoemitters and detectors (sensors) may be used to detect a full collection bin and inform the operator to remove the sorted envelopes. It is desirable, of course, that the operator regularly make the rounds of the collection bins 52 and notice, by looking into the open ends thereof, which bins are full. The operator can then regularly remove stacks of sorted envelopes from the collection bin. Rapid and reliable sorting is therefore facilitated by means of the hereindescribed sorter apparatus.

From the foregoing description it will be apparent that there has been provided improved sorting apparatus, especially adapted for sorting mail. Variations and modifications in the hereindescribed apparatus, within the scope of the invention and the use thereof for sorting other items in different categories will undoubtedly suggest themselves to those skilled in the art. Accordingly, the foregoing description should be taken as illustrative and not in a limiting sense.

I claim:

1. Mail sorting apparatus which comprises a plurality of collection bins each for a different category of mail item, said collection bins being spaced from each other along a closed path, a plurality of sorting bins moveable along said path, said sorting bins being disposed vertically above said collection bins, means for feeding said mail items separately into successive ones of said sorting bins, each of said sorting bins carrying an individual item of mail which can be of random category in successive ones of said sorting bins, means operative upon movement of each of said sorting bins into vertical alignment with the ones of said collection bins for the category of mail items therein for enabling said items to drop into said collection bins thereby to sort said mail items by category in said collection bins, a loading station past which said sorting bins move, a hopper at said station spaced vertically above a path of said sorting bins, said feeding means including means for feeding said items into said hopper one at a time, and means operated when said sorting bins move into alignment with said hopper at said station for enabling the mail item in said hopper to drop into the one of said sorting bins at said station.

2. The apparatus according to claim 1 wherein said closed path is circular such that the sorting bins revolve around said circular path over said collection bins, said collection bins and sorting bins being spaced along said path such that only one of said sorting bins is in vertical alignment with one of said collection bins to drop one of said mail items therein.

3. The apparatus according to claim 2 wherein said collection bins are stationary.

4. Mail sorting apparatus which comprises a plurality of collection bins each for a different category of mail item, said collection bins being spaced from each other along a closed path, a plurality of sorting bins moveable along said path, said sorting bins being disposed vertically above said collection bins, means for feeding said mail items separately into successive ones of said sorting bins, each of said sorting bins carrying an individual item of mail which can be of random category in successive ones of said sorting bins, means operative upon movement of each of said sorting bins into vertical alignment with the ones of said collection bins for the category of mail items therein for enabling said items to drop into said collection bins thereby to sort said mail items by category in said collection bins, a loading station past which said sorting bins move, a printing postage meter, said feeding means also including means for feeding said mail items successively into and out of printing relationship with said meter to present mail items for printing of postage indicia thereon, means responsive to at least one dimension of each of said mail items for moving said mail items and postage meter in a direction along a verticla edge of said items with respect to each other to locate said postage indicia on said mail items.

5. The apparatus according to claim 4 wherein said printing postage meter is movably mounted for reciprocation in a vertical direction, and motor means for moving said meter vertically to present a predetermined region of said mail items thereto for the printing of said postage indicia thereon.

6. The apparatus according to claim 4 further comprising means for holding said mail items in a stack, means for advancing said items one at a time to an input station, weighing means at said input station coupled to said postage meter for setting said meter in accordance with the weight of said item, means for encoding said mail items at said input station in accordance with the category thereof and controlling said means operative upon movement of said sorting means in accordance therewith, and means presenting each mail item at said input station to said feeding means successively.

7. Sorting apparatus which comprises a plurality of collection bins each for a different category of items to be sorted, said collection bins being disposed spaced from each other along an endless path in a generally horizontal plane, a plurality of sorting bins mounted for movement in unison along said path past a station, said sorting bins being disposed in a generally horizontal plane above said collection bins, a hopper disposed vertically above said station, means for feeding items to be sorted into said hopper one at a time, means for enabling said items to drop from said hopper into successive ones of said sorting bins as they pass said station, and means operative upon movement of each of said sorting bins into vertical alignment with a collection bin for the category of items carried in said sorting bins for enabling said items to drop into said collection bins for the category of said item.

8. Sorting apparatus according to claim 7 wherein said endless path is a circle, said sorting bins being disposed in a radial array about the center of said circle, said collection bins also being disposed in a radial array below said sorting bins, a vertical shaft having its axis at the center of said circle, said sorting bin array being mounted on said shaft, means for rotating said shaft, and means responsive to the position of said shaft for providing to said means for enabling said items to drop from said sorting bins into said collection bins signals representing the location of each of said sorting bins with respect to each of said collection bins.

9. Sorting apparatus according to claim 8 wherein said collection bins are generally "U" shaped cells open at the top, said cells being spaced from each other a sufficient distance such that no two sorting bins are in alignment with any one of said collection bins.

10. Sorting apparatus according to claim 8 wherein said cells have vertical sides and floors which slope downwardly toward one side thereof to guide said items toward said side of said cell as they drop therein.

11. Sorting apparatus according to claim 10 wherein the side of said cell opposite to said one side thereof has a flange thereon downwardly inclined into said cell for guiding said item as they drop therein.

12. Sorting apparatus according to claim 8 wherein each of said sorting bins comprises a pair of generally parallel plates forming the sides of said sorting bin, said plates being disposed generally radially with respect to said circle and spaced from each other along the top edges thereof to open the top of each of said sorting bins, at least one of said plates being pivotally mounted, means for yieldably biasing said one plate to pivot toward the other of said plates to close the bottom of said sorting bin, said means for enabling said items to drop from said sorting bins into said collection bins comprising means adjacent to each of said collection bins for selectively engaging said one side of said plate to cause said one side to pivot to open the bottom of said sorting bin upon movement thereof into alignment with the collection bin for the category of the item carried by said sorting bin.

13. Sorting apparatus according to claim 12 wherein at least said one side plate of each of said sorting bins has a lip along the bottom edge thereof extending toward and below the bottom edge of the other side plate when said bin is closed.

14. Sorting apparatus according to claim 13 further comprising wedge shaped blocks at the opposite ends of said sorting bins, said blocks having opposite edges one of which being attached to said other side plate and the other facing said one side plate, at least said other edge of said block being of material having damping characteristics.

15. Sorting apparatus according to claim 8 wherein said hopper comprises a bin having sides disposed generally radially of said circle, opposite ends of said hopper facing the center of said circle and said feeding means respectively, said end facing said feeding means being open, said sides of said hopper also having bottom edges spaced from each other to open the bottom of said hopper, a stationary bar below said hopper bottom edges for blocking the bottom opening of said hopper, said hopper being pendulously mounted to pivot away from said blocking bar, and said means for enabling said items to drop from said hopper into successive ones of said sorting bins comprising means adjacent to each of said sorting bins for engaging and pivoting said hopper to cause said hopper to pivot the bottom opening thereof clear of said blocking bar when said sorting bin passes below said hopper bin at said station.

* * * * *